United States Patent

[11] 3,545,633

[72] Inventor John P. Lundberg
 Washburn, Wisconsin
[21] Appl. No. 814,714
[22] Filed April 9, 1969
[45] Patented Dec. 8, 1970
[73] Assignee Beloit Corporation
 Beloit, Wisconsin
 a corporation of Wisconsin

[54] FOLDING CAB FOR TRUCK-MOUNTED LOADERS
 8 Claims, 5 Drawing Figs.
[52] U.S. Cl. .................................................... 214/147,
 214/77; 180/89; 296/28
[51] Int. Cl. .................................................... B66c 23/00
[50] Field of Search ......................................... 214/147,
 147(G), 77, 78, 79, 80; 180/89; 296/28

[56] References Cited
 UNITED STATES PATENTS
3,431,016 3/1969 Mundt-Petersen .......... 296/28
3,451,713 6/1969 Hollingshead ................ 296/28

Primary Examiner—Gerald M. Forlenza
Assistant Examiner—George F. Abraham
Attorney—Dugger, Peterson, Johnson and Westman ABSTRACT: A cab for protecting the operator of a truck-mounted loader comprises lower and upper closure units. The lower closure is suitably mounted on an elevated platform above the truck. The upper closure unit is pivotally connected to the lower closure unit so that it can be swung or folded downwardly to clear overhead obstructions as the truck moves along a highway.

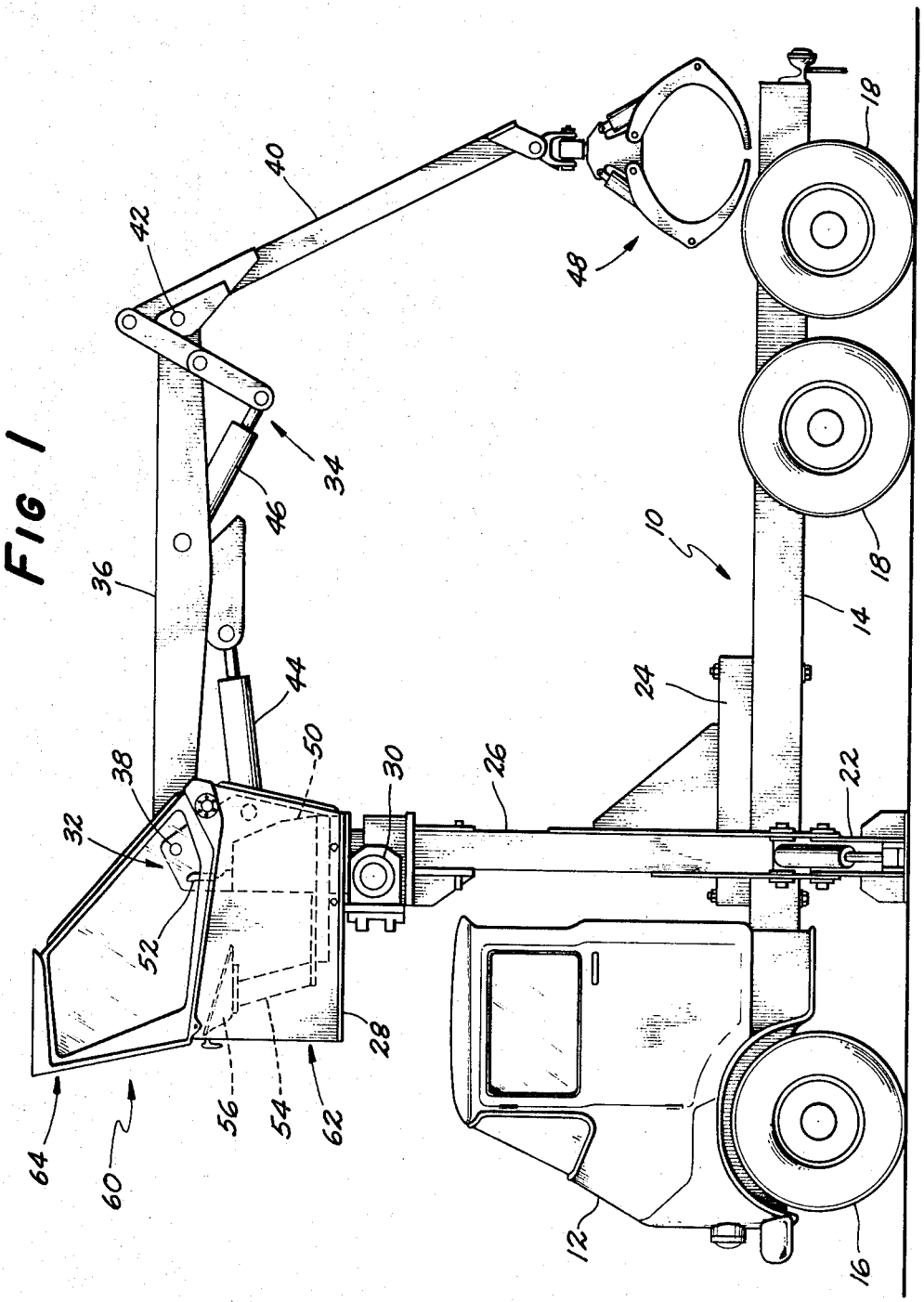

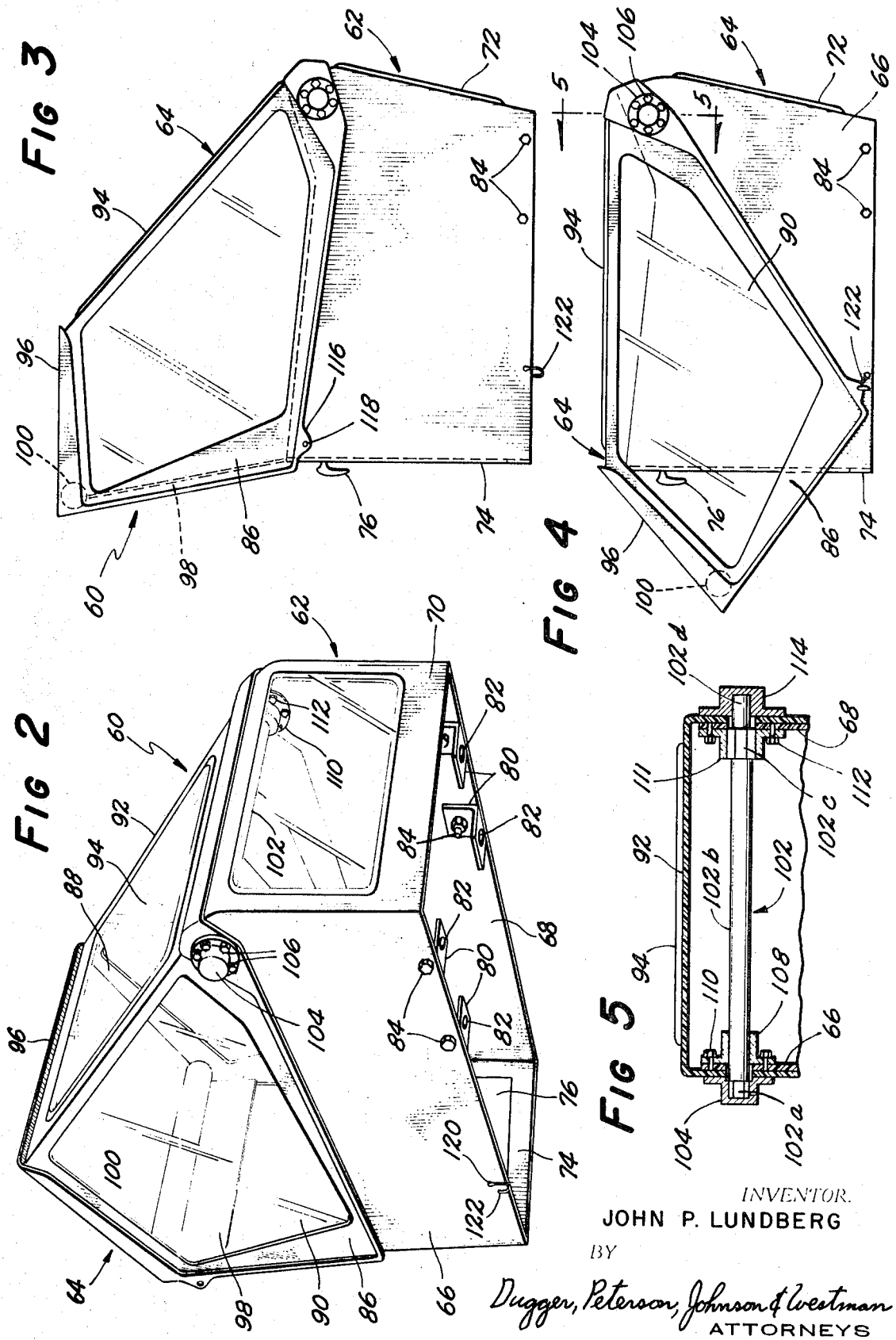

FOLDING CAB FOR TRUCK-MOUNTED LOADERS

BACKGROUND OF THE INVENTION

1. Field of the Invention

This invention relates to operators' cabs and pertains more particularly to a cab composed of two sections or units which can be nested together in order to reduce the cab height during highway travel.

2. Description of the Prior Art

In a number of power equipment operations, the operator must sit at an elevated vantage point in order to have an unrestricted view of the work he is performing. This is particularly true with respect to various types of loaders, especially those concerned with the loading of pulpwood. Little, if any, thought or attention has been previously given to the comfort of the operator. Such approaches have in the past been discouraged because a suitable cab structure would objectionably increase the height of the entire assemblage and thus inhibit the degree of mobility of the truck and the equipment mounted thereon. Therefore, the prior art, as far as I am aware, has refrained from employing any type of elevated enclosure which would protect the operator in adverse or inclement weather.

Accordingly, one object of the present invention is to provide a cab structure that will furnish effective protection or shielding for the operator, yet which can be folded or collapsed so as not to interfere with bridges and other overhead obstructions when the truck is moved along roads and highways.

Another object is to provide a cab structure that will be relatively lightweight, such as of plastic material, thereby allowing it to be readily attached to a conventional elevated platform without first having to reinforce or additionally strengthen the platform.

Another object of the invention is to provide a cab structure that can be easily attached to platforms of different sizes, it being possible for a part of the cab structure to overhang one edge of a relatively small platform.

The invention has for another object the provision of a ready ingress and egress from the cab structure when being used by the operator, it being contemplated that the operator may have to enter and leave the structure at various times in the performance of his duties.

Another object of the invention is to provide a cab structure that can be fabricated inexpensively, thereby encouraging its use in cost-conscious operations such as the loading of pulpwood.

Still another object of the invention is to provide a hinged cab structure in which the upper unit can be readily lowered and held in a lowered position during transit along a highway.

Yet another object is to provide a hinged cab structure in which the upper unit is normally biased into its usable position, the biasing action being overcome when the upper unit is to be lowered.

Briefly, the invention envisages a first or lower closure unit that is attached to the usual platform mounted atop a vertical mast on a truck. A second or upper closure unit is pivotally connected to the lower closure unit so as to swing about a horizontal axis. Included in the pivotal connection is a torsion bar or shaft that normally biases the upper unit into its raised position, means being provided for holding the upper unit in its folded or collapsed condition when not in use. Appropriate transparent panes enable the operator to look in various directions so that his view is not unnecessarily restricted by virtue of the cab structure.

BRIEF DESCRIPTION OF THE DRAWINGS

FIG. 1 is a side elevational view of a truck having a conventional pulpwood loader carried thereon, the view also including a cab structure exemplifying my invention;

FIG. 2 is a perspective view of the cab structure detached from the platform on which it is disposed in FIG. 1, the view being taken in an upwardly inclined direction;

FIG. 3 is a side elevational view with the upper unit raised as in FIG. 2;

FIG. 4 is a side elevational view but with the upper unit folded downwardly as when the truck is to be moved along a highway, and FIG. 5 is a fragmentary sectional view taken in the direction of line 5-5 of FIG. 4 for the purpose of illustrating the manner in which the two closure units are hinged together.

DESCRIPTION OF THE PREFERRED EMBODIMENT

Referring first to FIG. 1, a truck has been indicated generally by the reference numeral 10 and includes the usual cab 12 fixedly disposed on the forward end of a chassis 14. The truck 10 is provided with front wheels labeled 16 and rear wheels 18.

As far as the loading apparatus is concerned, in order to steady the equipment described below, a lateral stabilizer 22 is shown in FIG. 1. A base 24 is suitably attached to the chassis 14. Extending upwardly from the stabilizer 22 and rigidly connected with the base 24 is a vertical stem or mast 26. At the upper end of the mast 26 is an elevated platform 28. Subjacent the platform 28, but carried by the mast 26, is a hydraulic actuator 30. The hydraulic actuator 30 functions to angularly position a swing arm assembly denoted generally by the reference 32. The actuator 30, it can be explained, may be a typical gear rack having its teeth engageable with a pinion that is directly associated with the swing arm assembly 32.

Carried by the swing arm assembly 32 is a boom assembly designated generally by the reference numeral 34 which comprises a main boom section 36 which is pivotal about a horizontal axis provided by a pivot pin 38. A knuckle boom section 40 is pivotally connected to the main boom section by a pin 42. Appropriate hydraulic cylinders 44 and 46, respectively, function to raise and lower the individual boom sections 36 and 40. Attached to the free end of the knuckle boom section 40 is a typical grapple mechanism 48, the grapple mechanism being intended to load logs in the present instance. However, it will be appreciated that other implements may be substituted in lieu of the grapple mechanism 48 depending upon the particular type of work-performing operation that is to be conducted.

Also mounted on the platform 28 are hydraulic controls 50 which cause fluid under pressure to be selectively directed to the appropriate power units 30, 44 and 46. One handle 52 appears in FIG. 1 by which at least one of the operations is controlled. A standard or post member 54 supports at its upper end a seat 56 on which the operator sits when manipulating the hydraulic controls 50, more specifically the handle 52 and other handles (not shown) juxtaposed with respect thereto. It is while sitting on the seat 56 that the operator would be, quite obviously, exposed to various types of weather without the protection afforded by my cab structure.

Describing now the cab structure constituting the present invention, it will be discerned from FIGS. 1-4 that the structure has been designated in its entirety by the reference numeral 60 and may be fabricated for the most part from an appropriate plastic material, such as reinforced polyester. More specifically, the cab 60 includes a lower closure unit 62 and an upper closure unit 64. The lower unit 62 is comprised of a pair of spaced side panels 66, 68 and a front panel 70, the front panel having a transparent pane or window 72 providing a window down through which the operator may look in order to view the grapple mechanism 48 when picking up logs from the ground. The lower closure unit 62 further includes a rear access door 74 in order that the operator may enter and leave the cab structure 60. As can be seen in FIGS. 3 and 4, a handle 76 is attached to the door 74.

Inasmuch as the platform 28 will vary in many instances as far as its size or dimensions are concerned, considerable leeway is provided for attaching the closure unit 62 to a particular platform. As shown in FIG. 2, a number of angles 80 have been employed, the angles having horizontally arranged apertures 82 through which bolts may be inserted to anchor the various angles to the platform 28. The angles themselves are in turn attached to the closure unit 62, more specifically the side panels 66 and 68 thereof, by means of bolts 84.

As far as the construction of the closure unit 64 is concerned, it will be seen that this closure unit includes a pair of side panels 86 and 88, the panels 86 and 88 being laterally spaced a slightly greater distance or width than the spacing of the panels 66 and 68 of the lower closure unit 62. In this way, the upper unit 64, as will be better understood as the description progresses, can be nested, relatively speaking with the lower unit 62. Extending between the forward edges of the side panels 86, 88 is an upwardly and rearwardly inclining panel 92 containing a transparent pane 94 through which the operator views most of his operations, the angle of inclination being approximately 45°. The panel 92 has a length equal to the fore and aft length of the panels 66, 68. The upper closure unit 64 has a roof 96, and as best viewed in FIG. 3, the roof 96 has a fore and aft dimension approximately half of the length of the lower edges of the side panels 86, 88. The lower edges of the panels 86, 88, it will be noted, are coextensive in length with the fore and aft dimensions of the lower side panels 66, 68.

Unlike the lower closure unit 62 which has the door 74 at the rear, the upper closure unit has a sheet 98 of flexible transparent material, such as a sheet of clear vinyl, constituting a roll labeled 100 when raised. Although not illustrated in any of the views, the margins along each vertical edge of the material 98 may be provided with fastening tape having a myriad of small nylon hooks which would engage tape on the unit 64 having cooperable loops thereon. Such tape fastener is known as Velcro*. In this way, the material 98, which functions like a shade, may be held at any fully closed, partially closed or fully open position. It will soon be appreciated that the material 98 will have to be raised or fully opened when the upper closure unit 64 is to be swung or folded downwardly, and also when the operator enters or leaves the cab 60.

At this time, attention is directed to the pivotal connection by reason of which the upper unit 64 can be collapsed with respect to the lower unit 62. In this regard, a torsion bar or shaft 102 is utilized, the member 102 including a splined section 102a (which may be angularly related flats), a cylindrical shaft portion 102b, a second plined portion 102c (which may also be angularly related flats) and a stub shaft portion 102d. At this stage of the description, it should be emphasized that the purpose of the torsion bar 102 is to normally bias the upper closure unit 64 into its raised position as illustrated in FIG. 3, the biasing action being overcome when the upper closure unit 64 is lowered into the position depicted in FIG. 4.

Accordingly, the splined section 102a (or flats) has a cup-shaped member 104 in engagement therewith that is provided with internal splines (or flats) that engage the splines (or flats) of the section 102a. By means of screws 106, the cup-shaped member 104 can be fixedly secured to the upper closure unit 64, more specifically, the side panel 86 thereof. The cylindrical shaft portion 102b at the left, as viewed in FIG. 5, is journaled in a sleeve bearing 108 that is attached to the lower closure unit 62, more specifically the side panel 66, through the agency of a plurality of screws 110. In this way, the left end of the torsion bar 102 is fixedly connected with the upper unit 64 at its splined end 102a but is free to rotate with respect to the lower unit 62 because of the bearing 108. However, the splined section 102c is fixedly anchored to the side panel 68 through the medium of an internally splined member 111 which is fixedly attached to the side panel 68 by means of screws 112. The stub shaft portion 102d, though, is free to rotate within a second cup-shaped member 114 that may be affixed to the side panel 68 in a manner similar to the way in which the cup-shaped member 104 is secured to the panel 66 (the screws not being visible).

It is believed evident that when the upper closure member 64 is swung about the horizontal axis provided by the torsion bar or shaft 102 with respect to the lower closure unit 62 that the torsion bar 102 is twisted or flexed. Hence, if the free state of the torsion bar 102 exists when the upper closure unit 64 is in its raised position as illustrated in FIGS. 1, 2 and 3, the forcing downwardly of the upper closure unit 64 into the position pictured in FIG. 4 will result in the rotative flexing of the torsion bar 102 with the consequence that the upper unit 64 is biased upwardly and will return to the raised position appearing in FIG. 3.

For the purpose of holding the upper closure unit 64 down in its folded or collapsed relationship with the lower unit 62, an ear 116 is integrally formed on the lower edge of the side panel 86, the ear 116 having an aperture 118 therein. An aperture 120 in the lower side panel 66 is used to accommodate one end of a hook element 122. When the upper closure unit 64 is swung downwardly to overcome the biasing action of the torsion bar 102, the hook 122 functions to retain the upper closure unit 64 in the position in which it appears in FIG. 4, the panel 92 then being horizontal and for all intents and purposes producing a nested or collapsed cab structure 60 no higher than the seat 56. In this way, when the truck 10 is to be moved along a highway where overhead obstructions are likely to be encountered, the relationship illustrated in FIG. 4 may be resorted to, whereas when the cab structure is to be actually used, that is occupied by an operator, the hook 122 may be released so that the upper unit 64 is free to move upwardly under the influence of the torsion bar or shaft 102. The operator can enter through the door 74, the material 98 being raised to permit virtual unrestricted ingress to the cab structure 60. The material 98 is also rolled upwardly in order to allow the upper closure unit 64 to be swung downwardly to the position of FIG. 4. Hence, there is no interference to the collapsing of the upper unit 64 with respect to the lower unit 62 and the nested relation shown in FIG. 4 can be readily realized to facilitate travel to a new location.

I claim:

1. In combination with a truck, an upstanding mast on said truck, a platform mounted at the upper end of said mast, a boom assembly mounted at one end to the upper end of said mast, a work-performing implement carried at the free end of said boom assembly, and a cab structure comprising a first closure unit on said platform and a second closure unit pivotally connected to said first closure unit, said closure units each having a pair of laterally spaced side panels, the side panels of one unit being received within the side panels of the other unit when said second closure unit is pivoted downwardly.

2. The combination set forth in claim 1 in which said second closure unit is pivotally connected adjacent its forward bottom edge to the forward upper edge of said first unit, said second unit having a viewing panel inclining upwardly and rearwardly from its said forward bottom edge and a roof extending rearwardly from the upper edge of said viewing panel.

3. The combination set forth in claim 2 including a rear access door for said lower closure unit and a flexible sheet of material for said upper unit, said flexible material being capable of being rolled upwardly into adjacency with the rear edge of said roof to permit the nesting of said upper closure unit with respect to said lower closure unit.

4. The combination set forth in claim 3 in which the upper edges of the side panels of said first closure unit are substantially equal in length to the lower edges of the side panels of said second unit, said viewing panel inclining rearwardly at an angle of approximately 45° with respect to said lower edges of the second unit and said roof extending generally parallel to the lower edges of said second unit.

5. The combination as set forth in claim 1 including means for normally biasing said second closure unit upwardly.

6. The combination as set forth in claim 5 in which said biasing means includes a torsion bar having one end fixedly anchored with respect to one of said units and the other end fixedly anchored with respect to the other of said units.

7. The combination set forth in claim 5 including releasable hook means for holding said second closure unit down in nested relation with said first closure unit.

8. The combination set forth in claim 7 in which said hook means includes a hook located at the lower edge of said first unit and the lower edge of said second unit has an aperture for receiving said hook, the nested height of said units being approximately equal to the height of said first unit.